US010460185B2

(12) United States Patent
Hall et al.

(10) Patent No.: US 10,460,185 B2
(45) Date of Patent: Oct. 29, 2019

(54) ROADSIDE IMAGE TRACKING SYSTEM

(71) Applicant: TOYOTA MOTOR ENGINEERING & MANUFACTURING NORTH AMERICA, INC., Erlanger, KY (US)

(72) Inventors: Jonathan C. Hall, Ann Arbor, MI (US); Tomohiro Matsukawa, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/883,121

(22) Filed: Jan. 30, 2018

(65) Prior Publication Data

US 2019/0236382 A1    Aug. 1, 2019

(51) Int. Cl.
*G06K 9/00* (2006.01)
*G01C 21/34* (2006.01)
*G06K 9/78* (2006.01)
*G01C 21/36* (2006.01)
*G06K 9/20* (2006.01)

(52) U.S. Cl.
CPC ..... *G06K 9/00818* (2013.01); *G01C 21/3492* (2013.01); *G01C 21/3602* (2013.01); *G06K 9/00798* (2013.01); *G06K 9/209* (2013.01); *G06K 9/78* (2013.01)

(58) Field of Classification Search
CPC .......... G06N 3/02; G06N 5/046; G06N 7/005; G06N 20/00
See application file for complete search history.

(56) References Cited

U.S. PATENT DOCUMENTS

| 8,160,772 | B2 | 4/2012 | Ito et al. |
| 8,811,753 | B2 | 8/2014 | Stankiewicz et al. |
| 8,958,978 | B2 | 2/2015 | Fuehrer |
| 9,020,697 | B2 | 4/2015 | Ricci et al. |
| 9,230,379 | B2 * | 1/2016 | Ricci ........................ H04W 4/21 |
| 2012/0053825 | A1 * | 3/2012 | Schunder ........... G01C 21/3469 701/123 |
| 2012/0224060 | A1 * | 9/2012 | Gurevich .................. B60R 1/00 348/148 |
| 2013/0158821 | A1 * | 6/2013 | Ricci ...................... H04W 4/90 701/51 |
| 2013/0268193 | A1 * | 10/2013 | Kritt ...................... G01C 21/00 701/533 |

(Continued)

Primary Examiner — Ross Varndell
(74) Attorney, Agent, or Firm — Oblon, McClelland, Maier & Neustadt, L.L.P.

(57) ABSTRACT

A system and method for roadside image tracing are described herein. The system includes a camera mounted on a vehicle configured to capture images of objects around the vehicle while driving along a route of a plurality of routes, and processing circuitry. The processing circuitry is configured to receive the captured images from the camera and vehicle parameters including speed, a fuel level, and a mileage, extract objects and locations of the objects within the captured images including information related to driving, determine a route ranking based on the information collected from the objects during one or more trips along each route of the plurality of routes, generate route options based on the route ranking and the vehicle parameters, and transmit route options to a display.

12 Claims, 8 Drawing Sheets

(56) References Cited

U.S. PATENT DOCUMENTS

| | | | |
|---|---|---|---|
| 2015/0219468 A1* | 8/2015 | Ziezold | G01C 21/3453 |
| | | | 701/410 |
| 2015/0294223 A1* | 10/2015 | Brown | G06N 20/00 |
| | | | 706/46 |
| 2016/0351051 A1 | 12/2016 | Murthy et al. | |
| 2017/0046580 A1 | 2/2017 | Lu et al. | |
| 2017/0068245 A1* | 3/2017 | Scofield | G08G 1/0112 |
| 2018/0113914 A1* | 4/2018 | Mehedy | G06Q 50/01 |

* cited by examiner

ROADSIDE IMAGE TRACKING SYSTEM

BACKGROUND

Field of the Disclosure

This application relates generally to improvements in a roadside image tracking application for a vehicle. More particularly, this application relates to a system configured to detect and capture an image of surroundings including signs, and extract and process the image to determine vehicle-related information. The vehicle-related information can be used for a safety-related function to provide an enhanced driving experience.

Description of the Related Art

Vehicles are increasing becoming automated and included enhanced systems with functionalities to improve driving experience. Automated braking system, navigation systems, object detection and braking, and lane tracking are some example systems that are improve safety as well as enhance driving experience.

When driving on a route to work, for example, multiple road signs or advertisement boards are seen on the road side or overhead on gantries. A large amount of information is available during driving can be interpreted to further enhance the driving experience. Typically, a driver misses or has to quickly interpret such information while driving to determine routes, directions, obstructions or points of interest. Such distractions can be a driving hazard.

SUMMARY

Distractions and information sources from road signs and/or advertisement boards can be automatically captured and presented in advance, in real time, and/or after an event to further improve the driving experience. For example, a sign may not be legible to the naked eye, but camera technology can decipher the information. In another example, Quick Response (QR) code technology can be used to present a completely unique message to the driver.

According to an embodiment of the present disclosure, there is provided a system for roadside image tracing. The system includes a camera mounted on a vehicle configured to capture images of objects around the vehicle while driving along a route of a plurality of routes and processing circuitry. The processing circuitry is configured to receive the captured images from the camera and vehicle parameters including speed, a fuel level, and a mileage, extract objects and locations of the objects within the captured images including information related to driving, determine a route ranking based on the information collected from the objects during one or more trips along each route of the plurality of routes, generate route options based on the route ranking and the vehicle parameters, and transmit route options to a display.

The route ranking includes determining an average driving distance of the vehicle along each route of the plurality of routes, predicting a fueling time and a fueling location along each route of the plurality of routes based on the average driving distance, the vehicle parameters including the fuel level, and the information extracted from captured images including fuel prices, discounts, and road closures, and ranking each route of the plurality of routes based on the predicted fueling time and a predicted fueling location.

The processing circuitry is further configured to monitor, via captured images, road conditions including a weather condition, a construction zone, road closures, and accidents along the route, predict whether the road conditions affect driving along the route on a next trip, set warning flags based on predicted effect on driving, transmit the warning flags to a navigation system, and generate alternate route options for better driving experience.

Furthermore, according to an embodiment of the present disclosure, there is provided a method for roadside image tracing. The method includes receiving, via a network, captured images from a camera and vehicle parameters including speed, a fuel level, and a mileage, extracting, via the processing circuitry, objects and locations of the objects within the captured images including information related to driving, determining, via the processing circuitry, a route ranking based on the information collected from the objects during one or more trips along each route of the plurality of routes, generating, via the processing circuitry, route options based on the route ranking and the vehicle parameters, and transmitting, via a network, route options to a display.

The determining of the route ranking includes determining an average driving distance of the vehicle along each route of the plurality of routes, predicting a fueling time and a fueling location along each route of the plurality of routes based on the average driving distance, the vehicle parameters including the fuel level, and the information extracted from captured images including fuel prices, discounts, and road closures, and ranking each route of the plurality of routes based on the predicted fueling time and a predicted fueling location.

The method further includes monitoring, via the processing circuitry and captured images, road conditions including a weather condition, a construction zone, road closures, and accidents along the route, predicting, via the processing circuitry, whether the road conditions affect driving along the route on a next trip, setting, via the processing circuitry, warning flags based on predicted effect on driving, transmitting, via the processing circuitry, the warning flags to a navigation system, and generating, via the processing circuitry, alternate route options for better driving experience.

The forgoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

Figure 1:
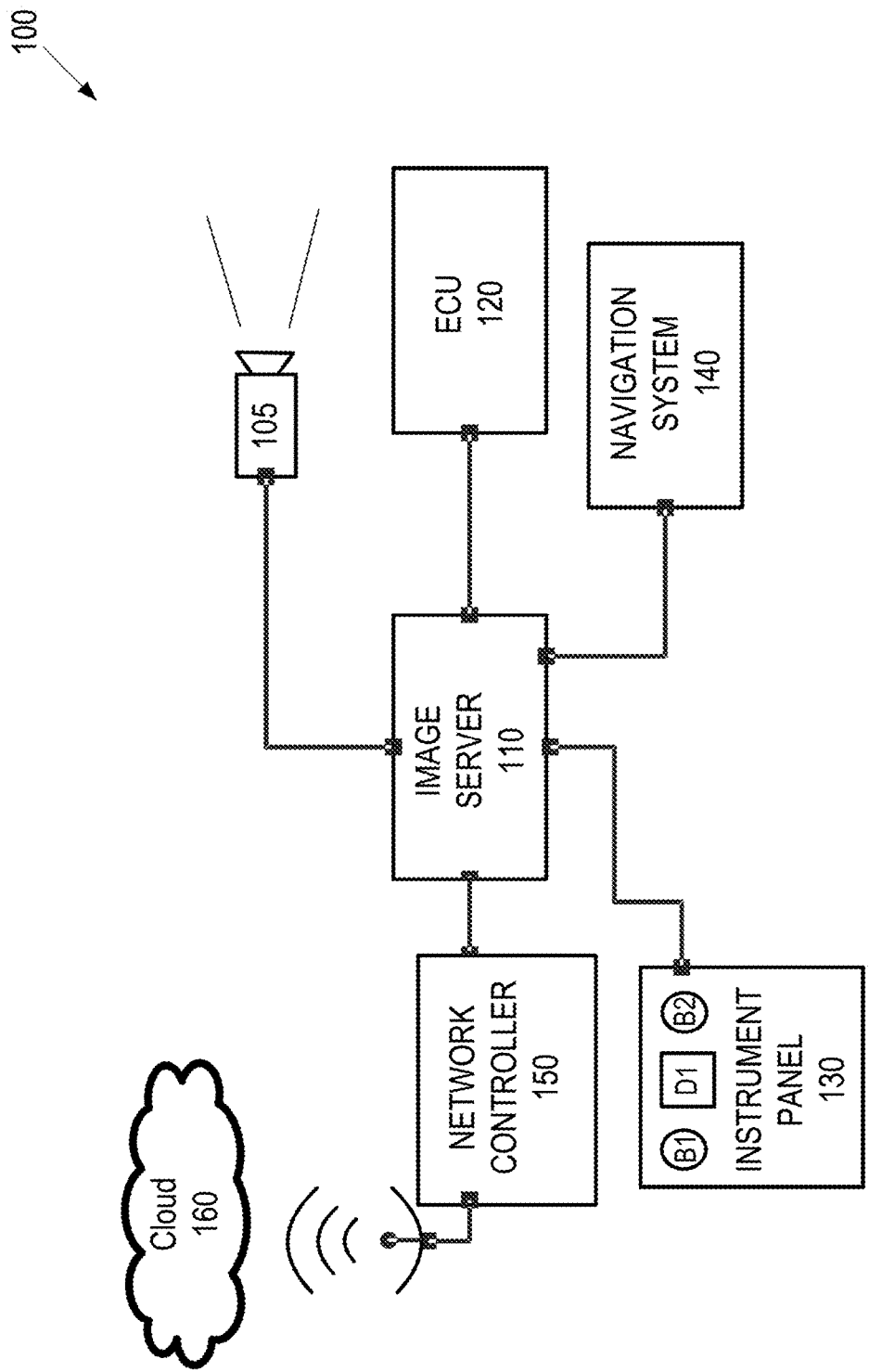
FIG. 1 is a block diagram of an image tracing system of a vehicle according to an embodiment of the present disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

FIG. 1 is a block diagram of an image tracing system 100 of a vehicle according to an embodiment of the present disclosure. The image tracing system 100 includes an image server 110 configured to receive images captured by a camera 105. The camera 105 can be installed on a front, back, side, rear or other appropriate location of the vehicle to capture images around the vehicle. The image tracing system 100 can also include a navigation system 140 that communicates, for example, via network controller 150, with the image server 110 (also referred as server 110, hereinafter). The image tracing system 100 can also include an instrument panel 130 accessible via a dashboard of the vehicle. The instrument panel 130 can include buttons B1, B2 and a display D1 that can be configured to communicate, for example, instructions, with the server 110 or receive information from the server 110 to be displayed on the display D1.

The server 110 can be configured to process the captured images and extract information from the captured images including text, graphics, signs etc. and interpret the extracted information to improve driving experience and/or improve efficiency of the vehicle. For example, the server 110 can extract fuel prices, construction activity with date and time, speed limits, etc. along a particular route. The extracted information can be further used to predict an optimum time to refuel the vehicle, predict delays along the route due to construction activities, suggest alternative route options, etc. Additional functionalities of the server 110 are discussed throughout the disclosure.

The server 110 can be further connected to an electronic control unit (ECU) 120 of the vehicle. According to certain aspects of the present disclosure, the server 110 can be configured to generate control signal that can be transmitted to the ECU 120. The control signals can be, for example, reduce speed of the vehicle when in cruise mode based on real-time images of a speed limit sign captured by the camera 105. The speed limit may be a standard speed limit sign such as on an interstate highway, or a speed limit sign set before entering a construction zone. The server 110 can extract and compare the speed limit with the current speed of the vehicle. The speed limit may be below a current speed of the vehicle; as such a speed reduction signal may be generated by the server 110. The server 110 can send the speed limit information or the speed reduction signal to the ECU 120. The ECU 120 can process such control signal from the server 110 as instructed within the ECU 120. For example, the ECU 120 may choose to act on the control signal to reduce the speed or ignore the control signal as the priority may be to maintain appropriate distance between adjacent cars.

The server 110 can also be configured to communicate with the navigation system 140 to access different route information. The server 110 can further generate route options by combining the route information from the navigation system 140 and images captured by the camera 105 along different routes. Additionally, the server 110 can be configured to update a particular route (e.g., a route to work, a route to school, etc.) within the navigation system 140 with images captured in the past along a particular route. For example, the updates can include construction activity scheduled on a particular day(s) and at a particular time, refueling based on optimum fuel location and time, etc. Based on the updates, if any construction work is carried out on certain days at certain time, then the navigation system 140 can suggest alternate routes.

The server 110 can also be configured to communicate with the network controller 150 to send/receive signals wirelessly. For example, the server 110 can store information such as captured images, construction activities, fuel prices at different locations, routes options, etc. to cloud storage 160 via the network controller 150.

Each of the functions of the described embodiments may be implemented by one or more processing circuits (also referred as controller). A processing circuit includes a programmed processor, as a processor includes circuitry. A processing circuit may also include devices such as an application specific integrated circuit (ASIC) and conventional circuit components arranged to perform the recited functions. The processing circuit can be a part of an image server 110 as discussed in detail in the present disclosure. The server 110 includes a CPU configured to perform processes described in the present disclosure. The process data and instructions (e.g., discussed with respect to FIGS. 2, 3 and 4) may be stored in a memory.

Figure 2:
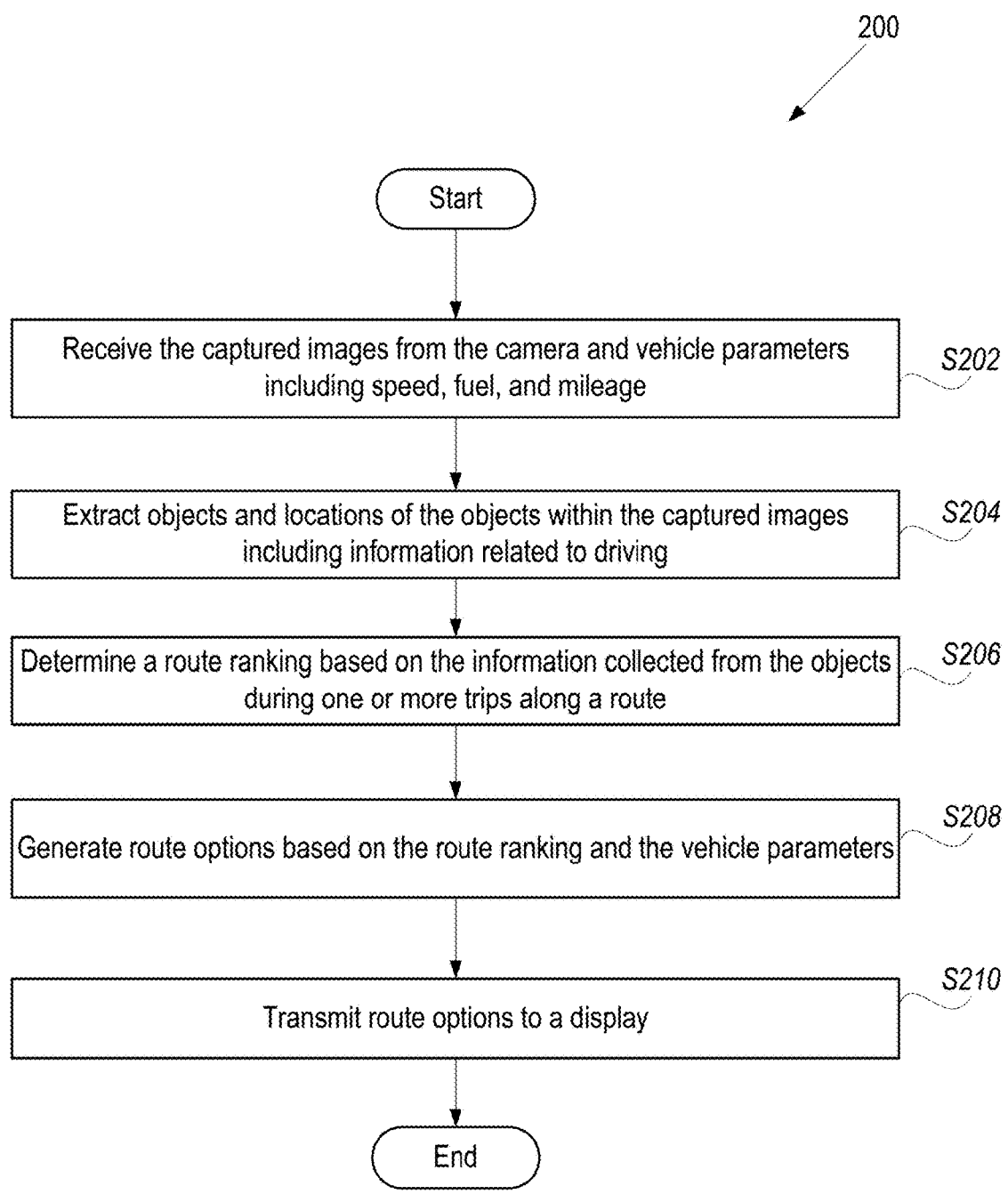
FIG. 2 is a flow chart of an image tracing process according to an embodiment of the present disclosure.

FIG. 2 is a flow chart illustrating an image tracing process 200 according to an embodiment of the present disclosure. The process starts when the vehicle is switched on and the camera 105 captures images of vehicle's surrounding. The vehicle can travel along a plurality of routes making one or more trips along each route. For example, the vehicle can travel along a first route to and from work, or along the first route to work, a second route to pick up kids and a third route to reach home. The vehicle can make one or more trips along such first, second and third routes every day or on particular a day of the week. The process 200 can be repeated for each trip along each such route.

Figure 5:
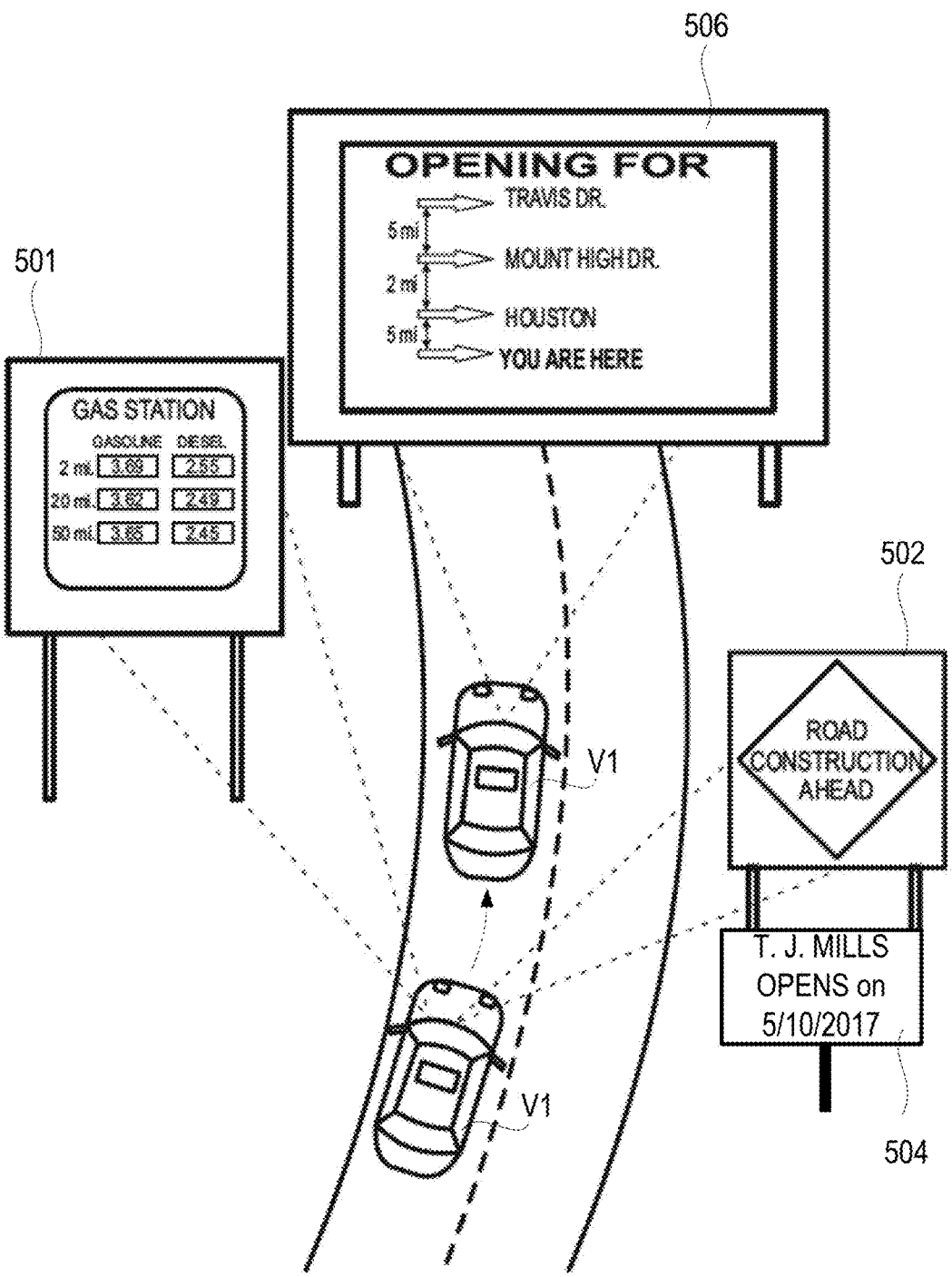
FIG. 5 illustrates an example scenario of capturing images along a route according to an embodiment of the present disclosure.

In step S202, the server 110 receives the captured images from the camera 105. Also, the server 110 can receive vehicle parameters including speed, a fuel level, and a mileage from the vehicle, for example, from the ECU 120. The captured images can include one or more objects such as a direction board including a location, a direction sign, or a distance, an advertising billboard, a road sign, an information display screen or other similar objects found while driving along a route. FIG. 5 illustrates example objects that can be captured while the vehicle is traveling along a route. In FIG. 5, the camera 105 of a vehicle V1 captures the gas station board 501, the road construction sign 502, an information board 504, and a direction board 506. According to one example, the information board 504 indicates that a T.J. Mills mall will be open on May 10, 2017, such information can be stored and later used by the server 110 to generate and display a message on May 10, 2017 indicating opening of the T.J. Mills mall. Alternatively or in addition, such information can be used to predict delays along the route going around or through T.J. Mills on May 10, 2017 and recommend alternative route options. Similarly, information from other objects can be used to, for example, generate alternate route options, refueling suggestions based on gas prices on board 501, directions to destinations based on board 502, 504, and/or 506, and other similar driving enhancing experience.

Figure 6:
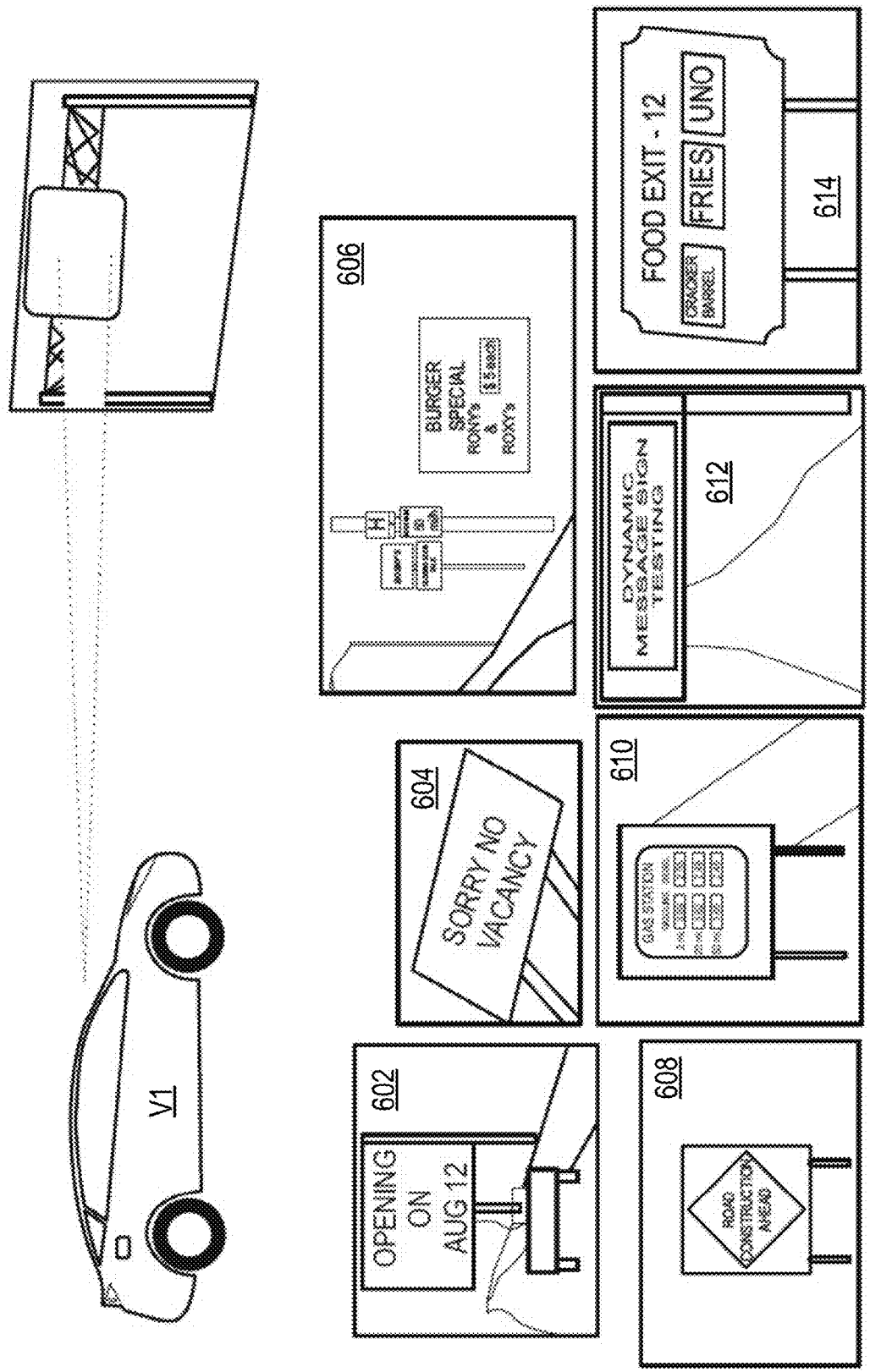
FIG. 6 illustrates example images captured by a camera along a route according to an embodiment of the present disclosure.

Additional example images that can be captured by the vehicle V1 are illustrated in FIG. 6. In FIG. 6, the camera 105 can capture images of boards such as boards 602, 604, 608, 612, 614 or images having a group of boards such as in image 606.

Figure 7:
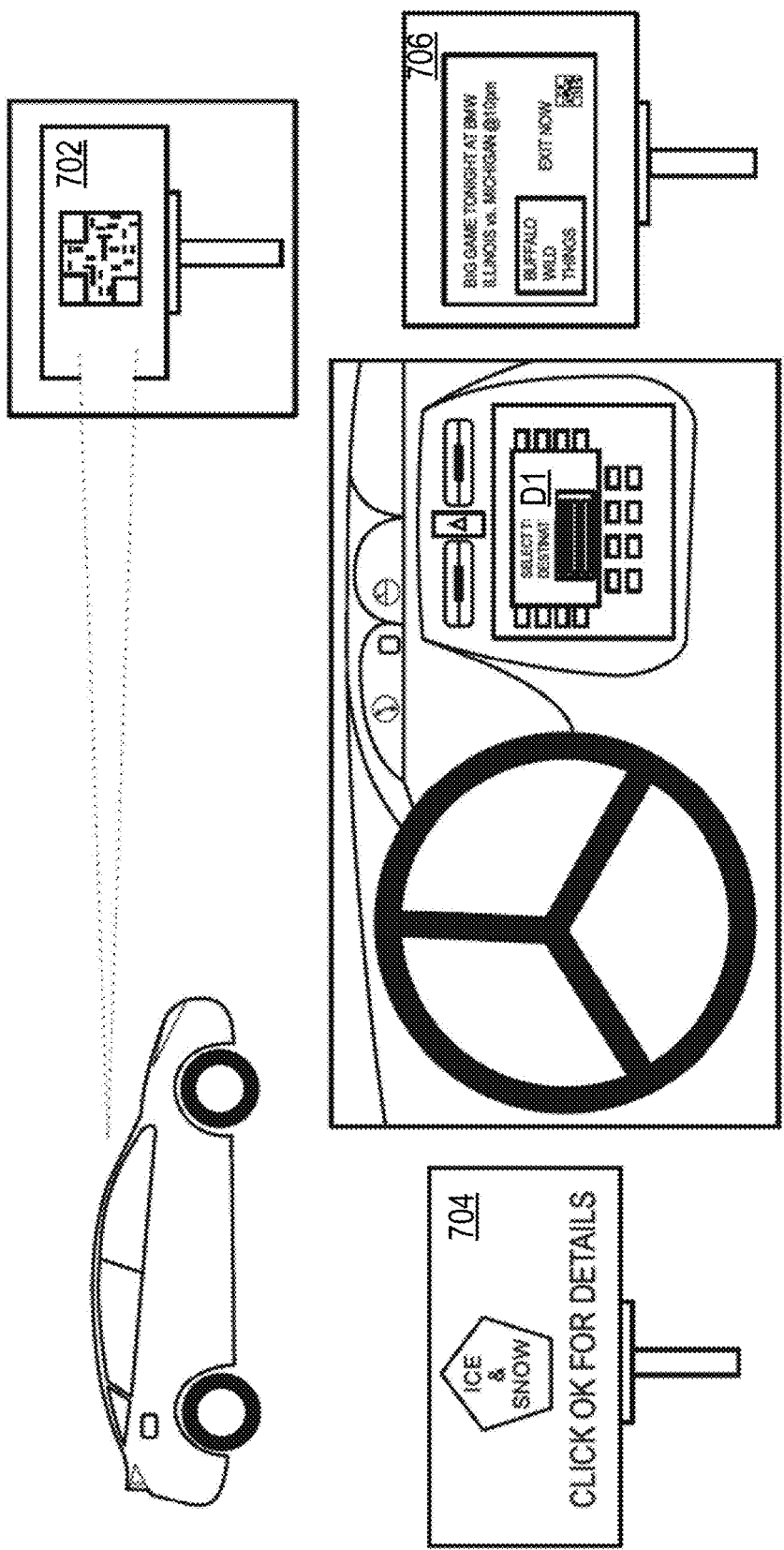
FIG. 7 illustrates example images captured by a camera and instrument panel according to an embodiment of the present disclosure.

In another example images that can be captured by the vehicle V1 are illustrated in FIG. 7. In FIG. 7, the camera 105 can capture images of boards 702, 704, 706. The images can be displayed on the display D1 of the instrument panel of the vehicle. According to one embodiment, the server 110 can extract graphical information such as a QR code on the board 702. The QR code can then be interpreted and relevant information captured by the server 110.

In step S204, the server 110 extracts objects including boards 602, 604, 606, 608, 610, 612, 614, object locations along the route, as well as information within the objects that relates to driving. The information refers to any information that is useful to enhance or improve the driving experience. Such information can be present as text, graphics, signs, etc. For example, the board 602 (in FIG. 6) can be located 5 miles from a start location (e.g., home) along a route to destination, for example, work. The server 110 can store the location of the board 602 as well as extract information within the board 602 i.e., "opening on August 12". The information within the board 602 can be related to opening of a closed section of a road/lane along the route to work and such information can be used at later point in time to predict change in travel time or suggest alternate route options on August $12^{th}$.

Furthermore, according to one example, the server 110 can extract current gas prices from the board 610. For example, the board 610 can indicate gas prices that $3.69 within next 2 miles, $3.52 within next 20 miles, and $3.65 within next 50 miles. Such information can be used by the server 110 to determine an optimum fueling time and location. For example, the server can determine based on the mileage that the vehicle V1 has enough gas to travel more than 50 miles and a tank capacity is 15 gallons. So, based on the vehicle parameters and information from the images, the server 110 can determine that the optimum fueling location can be 15 miles, as the gas prices are relatively low (i.e., $3.52) within the next 20 miles and the tank will be relatively more empty after 15 miles, thus more gas can be filled at low gas prices. On the other hand, if the gas is filled after 40 miles, the vehicle will have to fill more gas at a higher price. Thus, the optimum fueling location can be 15 miles from current location.

In step S206, the server 110 can determine a route ranking based on the information collected from the objects during one or more trips along each route of the plurality of routes. According to one embodiment, the route ranking can be based on refueling, as illustrated in flowchart of FIG. 3.

Figure 3:
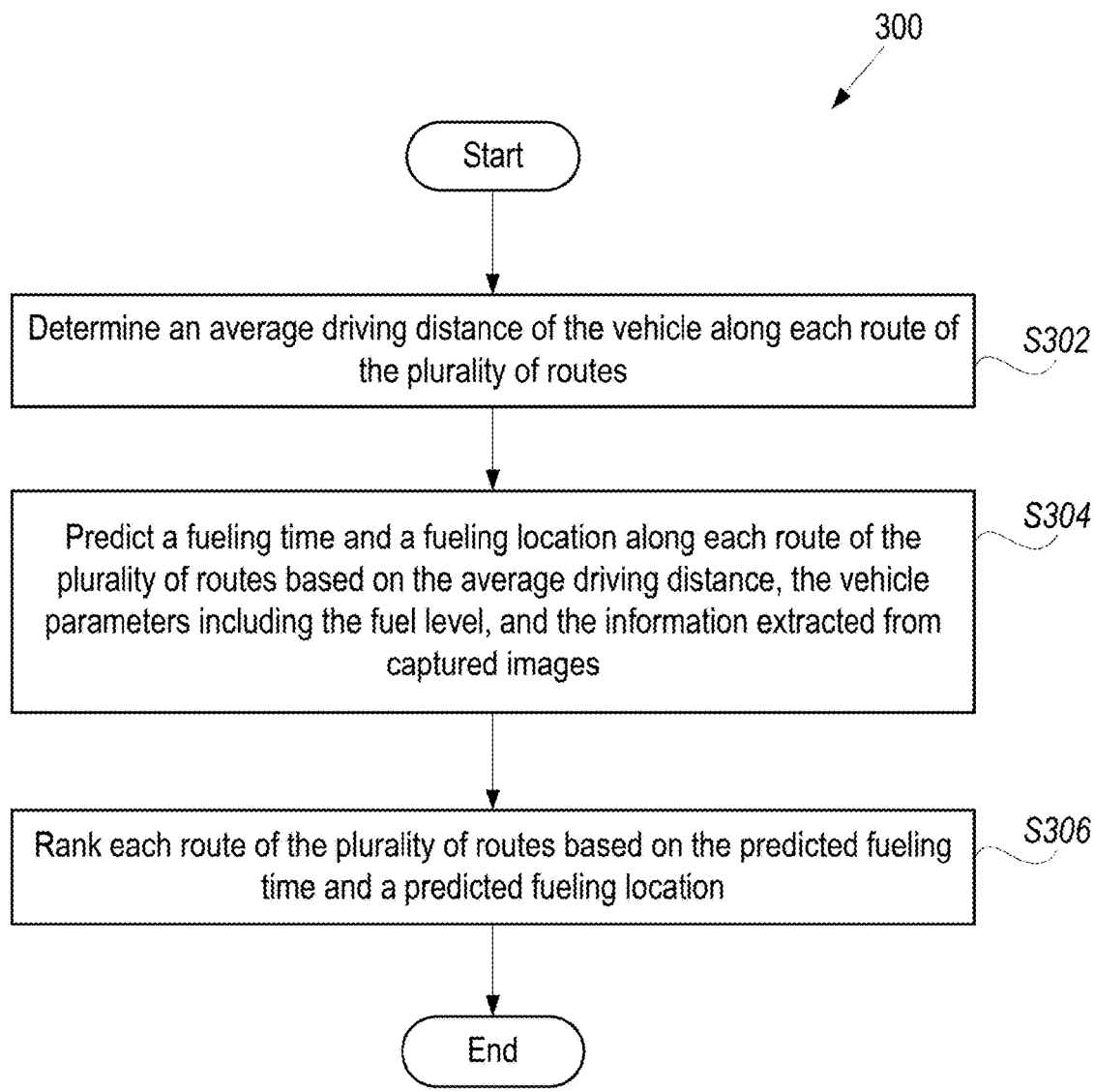
FIG. 3 is a flow chart of an example ranking process according to an embodiment of the present disclosure.

FIG. 3 is a flow chart for a ranking process 300 according to an embodiment of the present disclosure. The process 300 starts when the server 110 receives an image of a gas board such as board 501 and the server 110 extracts the gas prices and location along with a date and time or other relevant information.

In step S302, the server 110 determines an average driving distance of the vehicle along each route of the plurality of routes. An average driving distance computed based on a total distance traveled along a first route in one trip divided by total number of trips along the first route. For example, the first route can be between home to work and a first trip can be from home to work and a second trip can be from work to home. The vehicle can routinely travel along the first route on a weekday. Then, an average distance can be computed based on total trips per week. In one embodiment, a moving average may be calculated based on the most recent data or driving pattern. The driving pattern can be characterized by frequency to driving along a particular route, number of times a first route is selected over other routes, different destinations traveled to, amount of braking, time traveled per trip, refueling frequency, or other similar driving related parameters. Similarly, an average driving distance can be determined for a plurality of routes.

In step S304, the server 110 can predict a fueling time and a fueling location along each route of the plurality of routes based on the average driving distance, the vehicle parameters including the fuel level, and the information extracted from captured images including fuel prices, discounts, road closures information or other relevant information that may affect refueling. An example calculation is illustrated with respect to FIG. 8.

Figure 8:
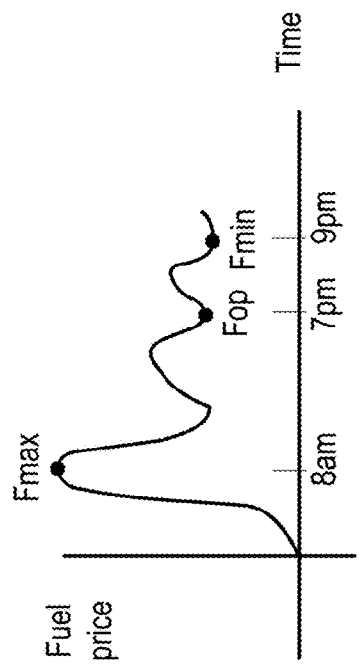
FIG. 8 a graph illustrating example refueling determination according to an embodiment of the present disclosure.

In the example of FIG. 8, the server 110 can compute a fuel price over a time of the day using actual fuel prices extracted from the images captured during the one or more trips along the first route (e.g., from home to work). The server 110 then modifies the actual price based on the traffic condition, fuel level in the vehicle, any road closures along the route, or other information extracted from the images that can affect refueling. The modified fuel price can be plotted with respect to time as shown in FIG. 8. The modified fuel price can vary throughout the day although the actual price may remain the same. For example, the modified fuel price can be maximum Fmax during the morning hours, for example, around 8 am, due to heavy traffic or road blocks. The fuel price Fmax can be relatively high since the vehicle may have to spend an increased time in traffic if fueled around 8 am. On the other hand, the modified fuel price can be minimum Fmin late at night, for example around 9 pm at a fuel location close to work, since there may be no road work, road blocks or detours. In addition, as the fuel location may be close to work, the additional distance traveled may be very less (e.g., less than 1 miles) to refuel. As such, the minimum fuel price Fmin can be at a fuel location close to work. However, the vehicle may routinely leave a location (e.g., from work) around 6:30 pm and may not be desired to wait till 9 pm for refueling. As such, an optimum fueling time may be around 7 pm at a location (not necessarily closest to work) along the first route, when the traffic conditions are not bad, or there are no roadblocks around 7 pm. As such, the server 110 can predict an optimum fueling time and location by considering a driving pattern, traffic conditions, location and prices of the fuel along one or more routes.

Figure 9:
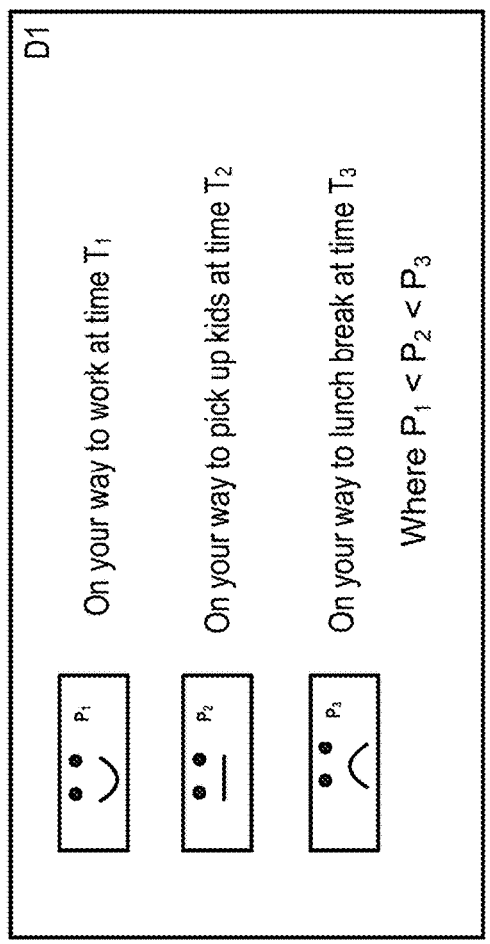
FIG. 9 illustrates example suggestions generated by the image tracing server according to an embodiment of the present disclosure.

In one embodiment, the server 110 can predict optimum fueling time and location by computing, as discussed above, for different routes and comparing the results of different routes to determine an optimum route as well as optimum fueling time and location along each route. The route options can be displayed on the display D1, as shown in FIG. 9 for user to select best option at the moment. For example, the vehicle may be traveling to work at time T1 and a first route may be determined as an optimum route option for refueling, so the vehicle can select the first option on the list. In another example, the vehicle may be travelling to pick up kids at time T2, in which case the vehicle can select a second option on the list displayed on the display D1. In yet another example, a third refueling option can be when the vehicle is travelling to a lunch location for lunch at time T3. At T3, the refueling may be most expensive, so the vehicle may ignore a third refueling option. The price $P_1$ for the option at $T_1$ is less than the price $P_2$ for the option at $T_2$. The price $P_2$ is less than the price $P_3$ for the option at $T_3$.

In step S306, the server 110 can rank each route of the plurality of routes based on the predicted fueling time and a predicted fueling location. The ranking can be a value between 1 (best) to 5 (worst), where a rank 1 is assigned to an optimum route, for example the first route at time 7 pm, and a rank 5 may be assigned to the worst route, for example, the first route at time 8 am. Similarly, each route can be ranked.

Furthermore, referring back to FIG. 2, in step S208, the server 110 can generate different route options based on the route ranking and the vehicle parameters. For example, depending on a destination, the server 110 can compare ranking of different route options and generate a list of best possible routes. For example, the route options can be a first route to a work place at time T1, a second route to work at time T2, a third route to a pick up kids, etc.

Figure 4:
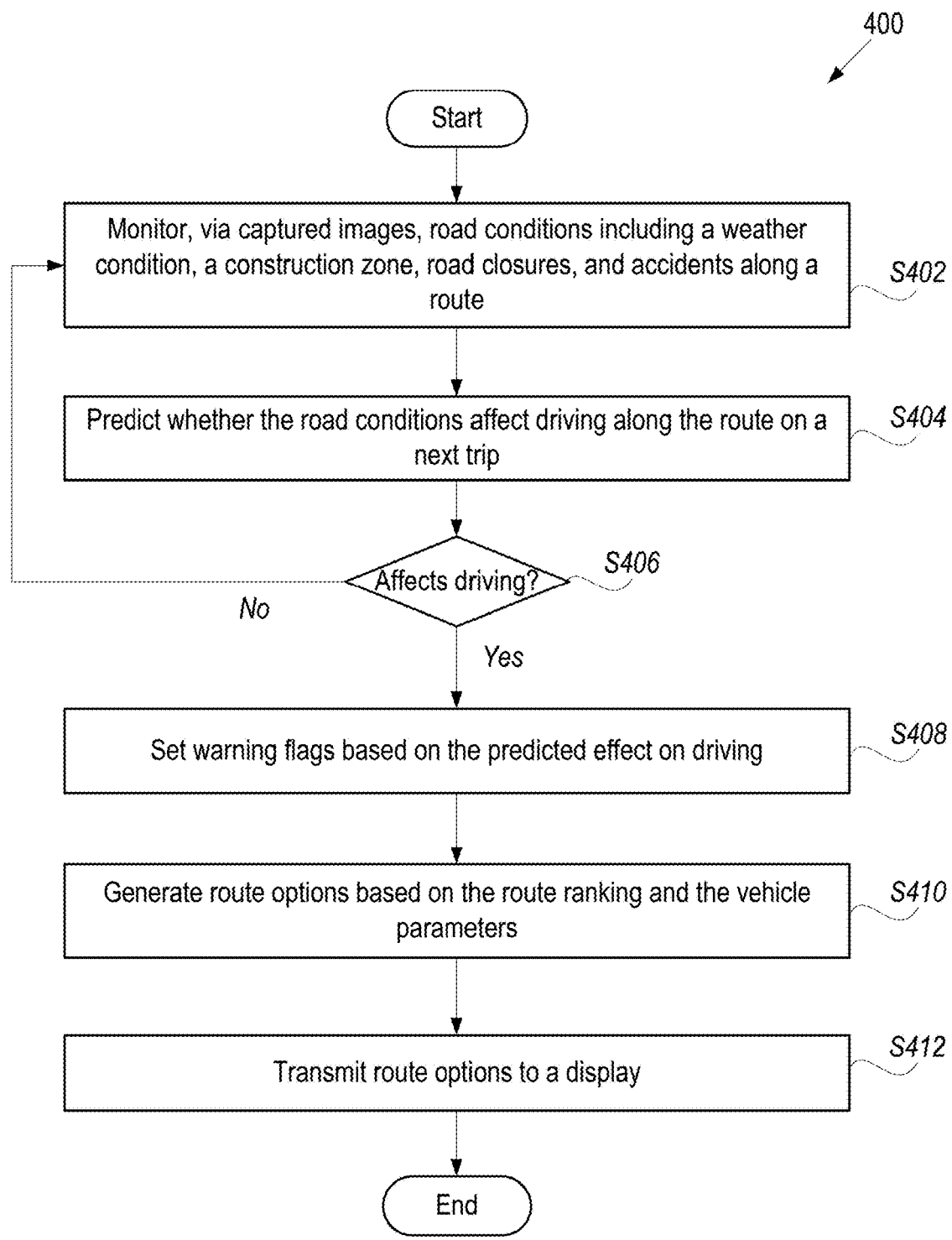
FIG. 4 is a flow chart of an example route option process according to an embodiment of the present disclosure.

FIG. 4 illustrates an example process to determine route options according to an embodiment of the present disclosure. In step S402, the server 110 can use the captured images to monitor road conditions including a weather condition, a construction zone, road closures, and accidents along the route. Further, in step S404, the server 110 can predict whether the road conditions will affect driving along a route on a next trip. For example, road condition can be road or a lane closure from 7 am-5 pm on a Wednesday along a first route (e.g., from home to work). As such, the server 110 can determine alternate route on Wednesday, if the vehicle is driven to work between 7 am-5 pm. In one embodiment, the process 300 can be performed in combination with the process 400 to determine an optimum route, if the server 110 determines refueling will be added advantage.

In step S406, the server 110 determines whether the driving is affected by the road condition. If the driving conditions are not affected, the server 110 keeps monitoring, as discussed in step S402.

However, if the road conditions affect the driving, in step S408, the server 110 can set warning flags based on predicted effect on driving. Furthermore, in step S408, the server 110 can transmit the warning flags to a navigation system. As such, the navigation system is updated for potential interruptions in driving along a route. Thus, when the vehicle uses the navigation system to travel to a destination, warnings can be issued in advance to allow user to choose alternate routes. The server 110 can generate alternate route options for better driving experience, in step S410.

Referring back to FIG. 2, in step S210, the server 110 transmits the route options to a display D1 of the vehicle. In one embodiment, one of the route options can be selected based on a current state of the vehicle, destination, or the like. In one embodiment, providing route options can allow user to make selection based on his/her plans at the moment. Thus, the route options can save time, money and enhance the driving experience by selecting route options that are appropriate at a particular moment for the user.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and subcombinations are intended to fall within the scope of this disclosure.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure. For example, this technology may be structured for cloud computing whereby a single function is shared and processed in collaboration among a plurality of apparatuses via a network.

What is claimed is:

1. A system for roadside image tracing comprising:
   a camera mounted on a vehicle configured to capture images of objects around the vehicle while driving along a route of a plurality of routes;
   processing circuitry configured to
   receive the captured images from the camera and vehicle parameters including speed, a fuel level, and a mileage;
   extract objects and locations of the objects within the captured images including information related to driving;
   determine an average driving distance of the vehicle along each route of the plurality of routes;
   predict a fueling time and a fueling location along each route of the plurality of routes based on the average driving distance, the vehicle parameters including the fuel level, and the information extracted from captured images including fuel prices, discounts, and road closures;
   determine a route ranking based on the information collected from the objects during one or more trips along each route of the plurality of routes and the predicted fueling time and a predicted fueling location;
   generate route options based on the route ranking and the vehicle parameters; and
   transmit route options to a display.

2. The system of claim 1, wherein the captured images include at least one of:
   a direction board including a location, a direction sign, or a distance,
   an advertising billboard,
   a road sign, and an information display screen.

3. The system of claim 2, wherein the information extracted from the captured images is in at least one of:
 a textual form, and
 a graphical form.

4. The system of claim 1, wherein the processing circuitry is further configured to
 monitor, via captured images, road conditions including a weather condition, a construction zone, road closures, and accidents along the route,
 predict whether the road conditions affect driving along the route on a next trip,
 set warning flags based on predicted effect on driving,
 transmit the warning flags to a navigation system, and
 generate alternate route options for better driving experience.

5. The system of claim 1, wherein the objects include a Quick Response (QR) code.

6. The system according to claim 1, wherein the processing circuitry is further configured to predict traffic delays based on the information related to driving, and further determine the route ranking based on the predicted traffic delays.

7. The system according to claim 1, wherein the average driving distance is determined based on a driving pattern over a predetermined length of time.

8. The system according to claim 7, wherein the driving pattern over the length of time includes routes driven during one week.

9. A method for recognizing a digital document, the method comprising:
 receiving, via a network, captured images from a camera and vehicle parameters including speed, a fuel level, and a mileage;
 extracting, via processing circuitry, objects and locations of the objects within the captured images including information related to driving;
 determining an average driving distance of a vehicle along each route of a plurality of routes;
 predicting a fueling time and a fueling location along each route of the plurality of routes based on the average driving distance, the vehicle parameters including the fuel level, and the information extracted from captured images including fuel prices, discounts, and road closures;
 determining, via the processing circuitry, a route ranking based on the information collected from the objects during one or more trips along each route of the plurality of routes and the predicted fueling time and a predicted fueling location;
 generating, via the processing circuitry, route options based on the route ranking and the vehicle parameters; and
 transmitting, via a network, route options to a display.

10. The method of claim 9, wherein the captured images include at least one of:
 a direction board including a location, a direction sign, or a distance,
 an advertising billboard,
 a road sign, and
 an information display screen.

11. The method of claim 10, wherein the extracting of the information from the captured images is in at least one of:
 a textual form, and
 a graphical form.

12. The method of claim 9, further comprising:
 monitoring, via the processing circuitry and captured images, road conditions including a weather condition, a construction zone, road closures, and accidents along the route;
 predicting, via the processing circuitry, whether the road conditions affect driving along the route on a next trip;
 setting, via the processing circuitry, warning flags based on predicted effect on driving;
 transmitting, via the processing circuitry, the warning flags to a navigation system; and
 generating, via the processing circuitry, alternate route options for better driving experience.

* * * * *